Dec. 3, 1968 A. WHITTELL, JR 3,413,969
HOT WATER SUPPLY SYSTEM HAVING MEANS TO PREVENT
OVERRIDE OF TEMPERATURE
Filed Dec. 28, 1966 2 Sheets-Sheet 1
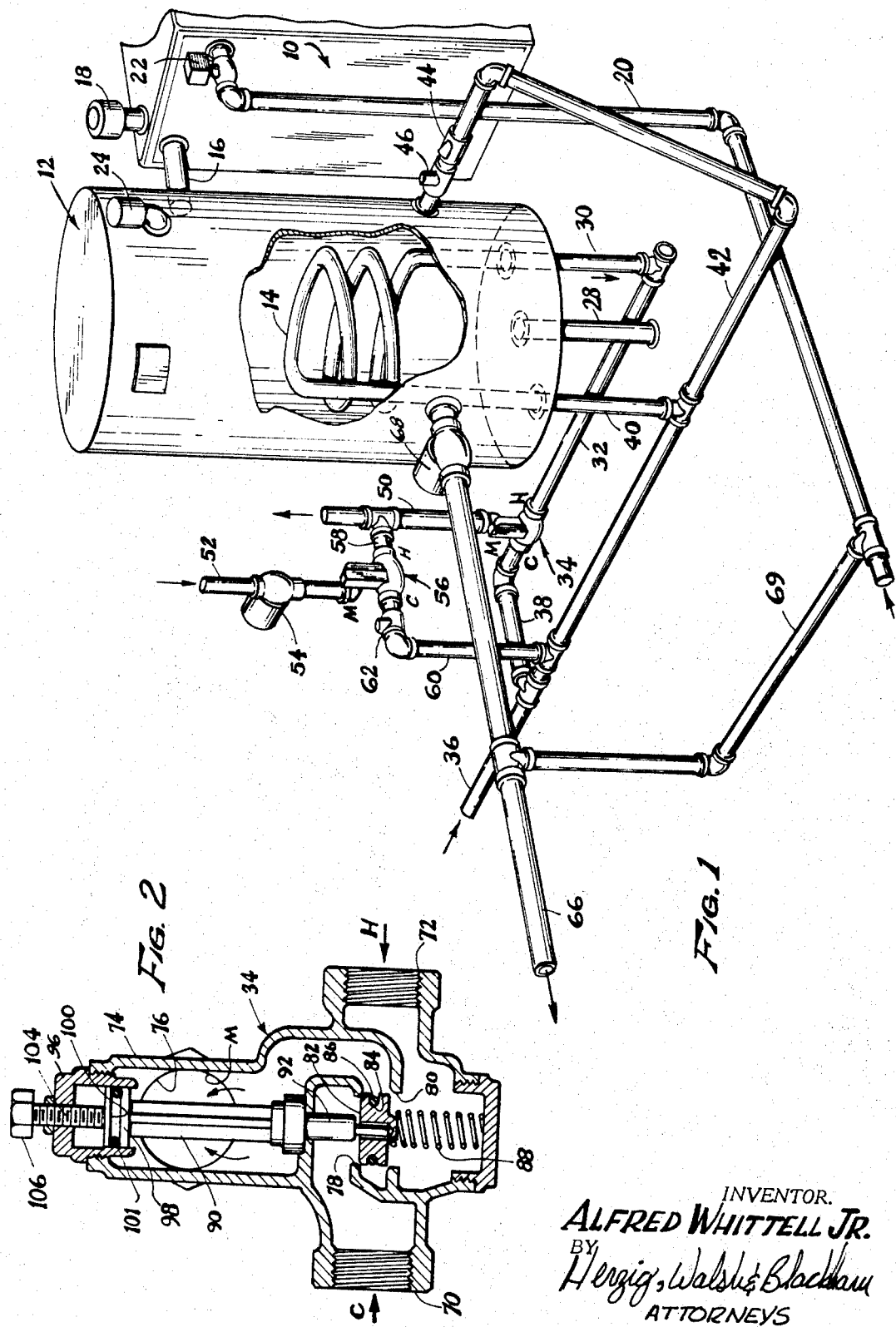
INVENTOR.
ALFRED WHITTELL JR.
BY
Herzig, Walsh & Blackham
ATTORNEYS

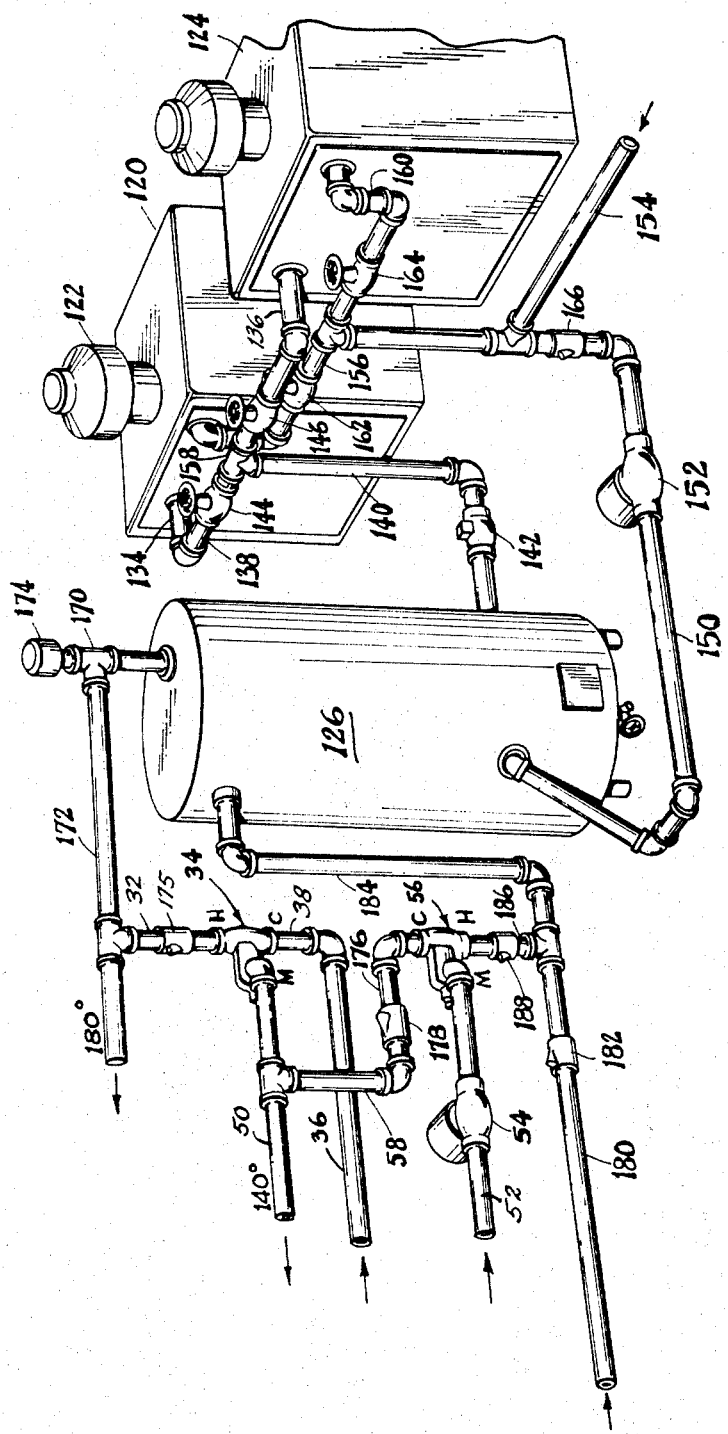

United States Patent Office 3,413,969
Patented Dec. 3, 1968

3,413,969
HOT WATER SUPPLY SYSTEM HAVING MEANS TO PREVENT OVERRIDE OF TEMPERATURE
Alfred Whittell, Jr., El Monte, Calif., assignor to Raypak Company, Inc., a corporation of California
Filed Dec. 28, 1966, Ser. No. 605,348
7 Claims. (Cl. 126—362)

ABSTRACT OF THE DISCLOSURE

The disclosure relates to hot water heating systems which include the supplying of domestic hot water at a temperature of 140°, for example. The domestic hot water supply is controlled by a temperature responsive three-way mixing or tempering valve at the inlet. A recirculating pump is provided in the domestic hot water circuit. In known systems of this type, during standby periods when there is no draw of water from the system, no cold water enters from the city water supply, and as a result, the temperature overrides, approaching that at the heat source, i.e., the boiler or heat exchanger, approaching 180° for example, at which temperature persons using the water may be scalded. To meet the problem, an additional temperature responsive three-way mixing or tempering valve is used in the return line from the domestic hot water supply. The mixing or tempering valve in the return line is connected so that the return water enters the "M" port in which the thermostat is located, so that part of it is bypassed to the inlet line to the domestic hot water circuit, and part of it is returned to the heat source.

Summary of the invention

The invention relates to hot water heating systems which may be systems for supplying domestic hot water, water for heating, and for heating swimming pools. The system may be a dual temperature system supplying hot water at different temperatures, such as, for example, 140° and 180°, the higher temperature water being for sterilizing dishes, for example.

The water to the domestic hot water supply is controlled at the inlet by a three-way thermostatic mixing or tempering valve. This valve has ports designated C, H and M. City water enters through the C port; hot water from the heat source or boiler enters through the H port; the outlet is through the M port in which is positioned the thermostat for controlling the temperature to the domestic hot water supply.

Normally, in a system of this type, a circulator is provided to continuously circulate the water in the domestic hot water circuit. During standby periods or when there is no draw from the system, this water is continually circulated through the boiler or heat source with no cold water entering and, accordingly, an override of temperature is experienced and the temperature in this system may rise to 180°, a temperature at which users may be scalded.

The herein invention makes provision to solve and remedy the problem. A thermostatically controlled three-way mixing or temperature valve is used in the return line from the domestic hot water supply. The return line is connected to the M port having the thermostat in it, which causes the returning water to be divided between the H and C ports. In other words, part of it is bypassed to the inlet line to the domestic hot water supply to be recirculated, and part of it is returned to the boiler. In this manner, sufficient of the water in the domestic hot water circuit is simply recirculated, without being returned to the heat source to prevent the undesired override of temperature.

In the light of the foregoing, the principal object of the invention is to meet and overcome the problem of override of temperature in hot water heating circuits of the type described, wherein the control is by way of a thermostatic three-way mixing or tempering valve.

Another object is to solve this problem in the manner described, i.e.. by way of bypassing and recirculating water from the return line of this circuit, preferably accomplishing this by way of a thermostatic three-way mixing valve in the return line.

Further objects and additional advantages of the invention will become apparent from the following detailed description and annexed drawings wherein:

FIGURE 1 is a diagrammatic view of a hot water heating system embodying the invention;

FIGURE 2 is a cross-sectional view of the three-way mixing or tempering valve used; and FIGURE 3 is a diagrammatic view of a modified form of heating system embodying the invention.

Referring now to FIGURE 1 of the drawings, numeral 10 designates a heat source in the form of a heating unit or boiler which may be of a known type. This unit may be gas fired, by way of example.

Associated with the unit 10 is a heat exchanger unit or tank 12. This unit may be of a type embodying in it a single heat exchange coil or twin heat exchange coils. The unit shown embodies a single heat exchange coil 14 in which the water for the domestic hot water supply is heated as will be described. Heated water is supplied from the boiler unit 10 to the heat exchanger 12 through the pipe 16. Numeral 18 designates a relief valve on the boiler unit. Numeral 20 designates the return line from the heating system to the boiler 10. Numeral 22 designates a flow switch which may optionally be used to control a water circulator or pump 68 in the system.

Numeral 24 designates an air vent on the heat exchanger 12.

The heat exchange unit 12 is supported on a standard 28. The system may be set to operate to heat the water in the heat exchanger 12 to a temperature of 180°, for example, so that under certain conditions the temperature in the coil 14 may be raised substantially to this temperature. Numeral 30 designates the output line or pipe from the coil 14. This pipe is connected to pipe 32. This pipe is connected to a three-way mixing or tempering valve 34 shown in cross-section of FIGURE 2. Numeral 36 designates a line from the city water supply. It has a branch line 38 connecting to the tempering valve 34. It connects to a line 40 delivering water to the coil 14. It also has a continuation 42 connecting to the tank of the heat exchanger 12 through a check valve 44 and pressure regulating valve 46. Make-up feed water for the system can be delivered through the branch or continuation line 42.

The tempering valve 34 has an outlet line or pipe 50 connected to the domestic hot water system in which it is desired to supply water to be maintained at a temperature of 140°, for example. Numeral 52 designates the return line from the domestic hot water supply system. In this line is a motorized pump or circulator 54 which may be is like the tempering valve 34 except that the connections to another three-way mixing or tempering valve 56 which is like the tempering valve 34 except that the connections thereto are different, as will be made clear presently. The tempering valve 56 is connected through a branch or bypass line 58 to the line 50 leading to the domestic hot water supply. It is also connected through a line 60 having check valve 62 in it to the city water supply line 36.

Numeral 66 designates the supply line to the hot water heating system. In this line is a pump or circulator 68 which may be controlled in any suitable and known manner. Numeral 69 designates a line connected between the supply line 66 to the hot water heating system and the return line 20. The system may include additional lines for providing a supply of hot water to a swimming pool and a return line therein with the necessary associated appliances.

Referring to the three-way mixing valve 34 shown in FIGURE 2, this is a known type of valve having a body with oppositely disposed ports or channels 70 and 72. It has an upper cylindrical part 74 having a port 76. Within the valve is an upper seat 78 and a lower seat 80 and cooperating with these seats is a valve member 82 having an annular groove 84 with a sealing O-ring 86 in it. The valve member 82 is biased towards the upper seat by a coil spring 88.

In the upper cylindrical part 74 of the valve body is an hydraulic thermostatic member 90 which operates a stem 92 which adjusts the valve member 82 with respect to the upper and lower seats.

In the upper part of the cylindrical part 74 of the valve body is a screw-threaded fitting 96 having a cylindrical bore. In this bore is a cylindrical member 98 having an annular groove 100 in which is a sealing O-ring 101. This member is adjustable by a threaded stem 104 extending through the fitting 96 and having an hexagonal head 106 at its end. By adjusting the stem 104, the setting of the thermostat can be adjusted.

In the conventional utilization of a three-way mixing or tempering valve, such as the valve 34, cold water is admitted through the port or channel 70 and hot water through the port or channel 72. These inflows are mixed by the valve and are discharged therefrom through the port 76 in response to the temperature controlled by the thermostat 90. In FIGURE 2 the port 70 is designated C for cold, and the port 72 H for hot, and the discharge port 76 is designated M. The valve 34 is connected in this manner in FIGURE 1. The purpose of the valve 34 in FIGURE 1 is to control the temperature of the water being supplied through the M port and line 50 to the domestic hot water supply. Normally, the valve 34 will operate to maintain the temperature in the line 50 to assure that water is not supplied at such a high temperature that the users using the domestic hot water may be scalded by it. In conventional arrangements of this type, the return line 52 from the domestic hot water supply with a circulator in it is connected directly to the line 36–40 leading back to the heat exchanger 12. It has been found that such a known arrangement is subject to certain serious deficiencies. It has been found that during standby periods when there is no draw, that is, use of water from the domestic hot water supply system, the circuit being full, the circulator simply continues to circulate the water through this system, there being no draw-in of cold water. The result is that the three-way mixing or tempering valve 34 is unable to and does not prevent the temperature from rising or overriding in the line to the domestic hot water supply such that the water supplied may approach that of the heat exchanger 12, that is, 180°. In these circumstances, there is, of course, serious danger that people using the water, such as in the showers, may be scalded.

The herein invention provides means for overcoming this deficiency. This is accomplished by the three-way tempering valve 56 and the bypass line 58. The three-way tempering valve 56 is connected differently than the valve 34. As explained above, the M port of valve 34 is connected to the line 50 so that the thermostat 90 controls the temperature in this line. On the other hand, the M port of the valve 56 is connected to the return line 52 of the domestic hot water supply system so that the water enters valve 56 through this port and is then divided, part of it discharging through the C port to the line 58 and part of it discharging through the H port to the line 60. Thus, under circumstances as described above where the water being delivered to the domestic hot water system tends to become too hot, the system, instead of continuing to recirculate this water through the heat exchanger 12 bypasses part of it through the bypass 58 directly back to the line 50 to the domestic hot water supply. In other words, with reference to the operation of the valve 56, considering FIGURE 2, when the water in the domestic supply circuit is at too high a temperature, the thermostat of valve 56 will tend to close off the H port and open the C port, allowing more of the water to be simply recirculated through the bypass line 58. Thus, it will be observed that during standby periods when there is no draw from the domestic hot water circuit, the temperature therein, instead of tending to override and rise to too high a temperature, will be maintained at a desirable temperature by the operation of the three-way tempering valve 56 which will bypass or directly recirculate a sufficient part of the water in this circuit to prevent its temperature from overriding.

As will be seen the valve 56 is like the valve 34, but is connected differently so that instead of acting as a mixing valve of two flows it separates the flow into two flows. Since it is like the valve 34 its ports are similarly identified.

FIGURE 3 shows a slightly different form of heating system, this being a dual temperature system wherein it is desired that water be available at two different controlled temperatures, such as for example, 140° for the domestic hot water supply and 180° for other purposes, such as sterilization of dishes in a scullery or the like. In this situation, it is important that the sterilizing water be at the correct temperature in order to meet the requirements of city health codes and the like.

To the extent that parts as shown in FIGURE 3 are the same as in the previous embodiment and they function the same, they are similarly numbered.

In FIGURE 3, numeral 120 designates a heating unit or boiler which may be a conventional gas fired type having a hood or stack 122. It is manifolded to a similar unit 124. These boilers supply water to a storage tank 126 in which the water may be maintained at a temperature of, for example, 180°. The temperature may be maintained by a controlling device. The tank 126 is supported on legs.

Boilers 120 and 124 discharge through lines 134 and 136, respectively, to a manifold 138. Line 140 is connected to this manifold and it connects to the tank 126. A flow switch 142 may optionally be provided for controlling the recirculation pump 152 as will be described. In the manifold 138 are manual valves 144 and 146. The return line from the storage tank 126 is designated at 150 having a recirculating pump 152 in it. Numeral 154 designates the city water line connecting to the line 150 which connects to a manifold 156 manifolding the inlets to the boilers 120 and 124 which are designated 158 and 160. In this manifold are manual valves 162 and 164. Numeral 166 designates a check valve in the line 150.

This system is a dual temperature storage tank system with recirculation and with one of the boilers normally serving as a standby boiler. The discharge from the storage tank 126 is through the line 170 to line 172 which is a line supplying water at the temperature of 180°, for example, to areas where water at this temperature is needed. Numeral 174 designates a temperature and pressure relief valve.

The line 172 is connected to the line 32 having check valve 175 in it to the H port of the three-way mixing or tempering valve 34. The M port of this valve is connected to line 50 which delivers water to the domestic hot water supply as in the previous embodiment. The line from the city water supply 36 connects through line 38 to the C port of the valve 34 as in the previous embodiment.

The return line 52 from the domestic hot water supply has the circular 54 in it and it connects to the M port of the three-way tempering valve 56. The C port of this valve is connected through a line 176 having check valve 178 in it and the bypass line 58 to the line 50 leading to the domestic hot water supply. Numeral 180 designates the return line from the 180° temperature system. This line has check valve 182 in it. It has a branch or continuation 184 leading to the storage tank 126. The H port of the three-way mixing or tempering valve 56 is connected through line 186 having check valve 188 in it to the line 180.

From the foregoing, it will be observed that the system of FIGURE 3 is a dual temperature system providing for a supply of water at 140° and 180°, for example. The additional three-way tempering valve 56 shown in FIGURE 3 operates the same as this valve in the embodiment of FIGURE 1. The difference in FIGURE 3 lies mainly in that the system supplies water at different temperatures.

From the foregoing, those skilled in the art will observe and understand the nature of the invention, its operation and the manner in which its objects and advantages, as outlined in the foregoing, are realized. The invention is directed to a particular problem as described which it meets and solves in a simplified and effective way.

The foregoing disclosure is represented of preferred forms of the invention and is to be interpreted in an illustrative rather than a limiting sense, the invention to be accorded the full scope of the claims appended hereto.

What is claimed is:

1. In a hot water heating system including a hot water source, a domestic hot water circuit including a recirculator and having temperature responsive valve means at the inlet thereto for regulating the temperature therein, the improvements comprising bypass means from the return line of the domestic hot water circuit to the inlet line thereof downstream of said temperature responsive valve means and means in said bypass means whereby the by-pass means is controlled to prevent override of temperature in the domestic hot water circuit.

2. A system as in claim 1 wherein said control means includes temperature responsive means responsive to the temperature in the return line of the domestic hot water circuit operable to bypass part of the returning water to the inlet line and part of it to the hot water source.

3. A system as in claim 1 including a supply line from said hot water source for delivering water at a higher temperature to another area and a separate return line therefrom to said heat source.

4. In a hot water heating system including a hot water source, a domestic hot water circuit including a recirculator and having temperature responsive valve means at the inlet thereto for regulating the temperature therein, the improvements comprising by-pass means from the return line of the domestic hot water circuit to the inlet line thereof, and means whereby the by-pass means is controlled to prevent override of temperature in the domestic hot water circuit, said control means comprising a three way tempering valve having thermostatic means in its inlet port and the inlet port being connected to the return line of the domestic hot water circuit, and operable to by-pass part of the returning water to the inlet line and part of it to the hot water source.

5. In a hot water heating system including a hot water source, a domestic hot water circuit including a recirculator and having temperature responsive valve means at the inlet thereof for regulating the temperature therein, the improvements comprising by-pass means from the return line of the domestic hot water circuit to the inlet thereof downstream of said temperature responsive valve means and means in said by-pass means whereby the by-pass means is controlled to prevent override of temperature in the domestic hot water circuit, said temperature responsive means comprising a three way tempering valve connected to the hot water source and a source of unheated water and having its outlet connected to the inlet of said hot water circuit.

6. A system as in claim 5 wherein said control means includes temperature responsive means responsive to the temperature in the return line of the domestic hot water circuit operable to bypass part of the returning water to the inlet line and part of it to the hot water source.

7. A system as in claim 6 wherein said control means comprises a three-way mixing and tempering valve having thermostatic means in its inlet port and the inlet port being connected to the return line of the domestic hot water circuit.

References Cited

UNITED STATES PATENTS

| | | |
|---|---|---|
| 1,773,976 | 8/1930 | Erickson. |
| 1,983,199 | 12/1934 | Stith. |
| 2,224,240 | 12/1940 | Van Vulpen et al. ____ 126—362 |
| 2,245,967 | 6/1941 | Dillon _____ 126—362 |
| 2,751,156 | 6/1956 | Morgan _____ 237—8 |
| 2,884,197 | 4/1959 | Whittell. |

FREDERICK L. MATTESON, JR., *Primary Examiner.*

ROBERT A. DUA, *Assistant Examiner.*